UNITED STATES PATENT OFFICE.

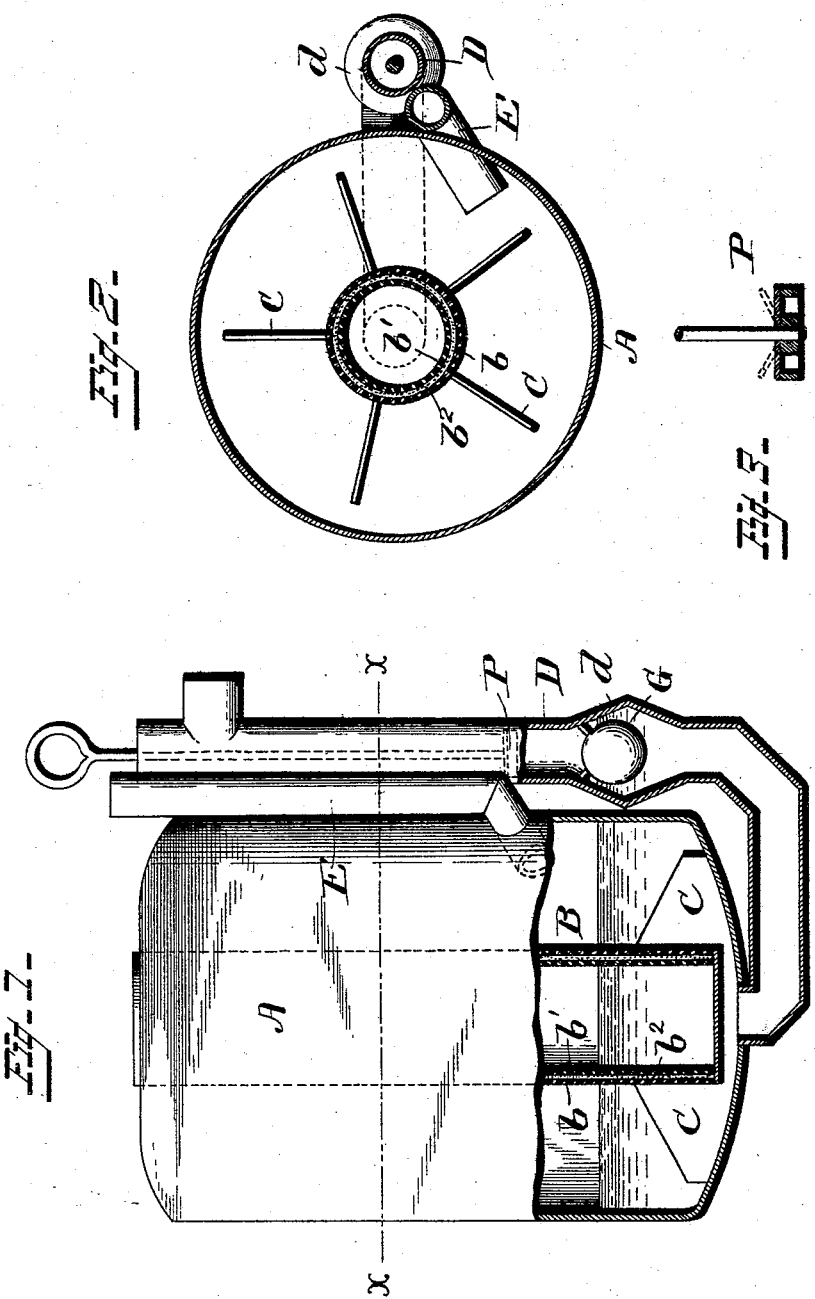

ABNER D. STRONG, OF ASHTABULA, OHIO.

FILTER.

SPECIFICATION forming part of Letters Patent No. 498,586, dated May 30, 1893.

Application filed April 4, 1892. Serial No. 427,580. (No model.)

*To all whom it may concern:*

Be it known that I, ABNER D. STRONG, a citizen of the United States, residing at Ashtabula, in the county of Ashtabula and State of Ohio, have invented certain new and useful Improvements in Filters; and I do hereby declare the following to be a full, clear, and exact description of the invention, such as will enable others skilled in the art to which it appertains to make and use the same.

This invention relates to filters.

The object of the invention is to provide an efficient and simple structure for separating the impurities from drinking water, and provide a convenient means for removing the mud or sediment from the bottom of the cistern or casing holding the water to be purified in a positive manner in the event of the water in the casing or cistern falling below the discharge end of the overflow pipe.

The improvements consist in the novel features and the peculiar construction and combination of the parts which will be hereinafter more fully described and claimed and which are shown in the annexed drawings, in which—

Figure 1 is a side elevation of the filter embodying my invention, parts being broken away to better show the details of construction. Fig. 2 is a horizontal section on the line X—X of Fig. 1. Fig. 3 is a detail view of the piston showing the upwardly opening valve.

The casing A which may be a cistern, tank or other suitable vessel and of any desired form, is preferably cylindrical in form and closed at its ends. A filtering cylinder B is centrally disposed within the casing and extends from near the bottom thereof through the upper closed end of the casing. This filtering cylinder is composed of two concentric tubes $b\ b'$ of foraminous metal between which is interposed a sheet $b^2$ of filtering material. This filtering sheet $b^2$ is snugly embraced between the opposing side of the said tubes $b$ and $b'$. This filtering cylinder is closed at its lower end and supported at a short distance above the bottom of the said casing A, being preferably attached to radial wings C which are connected at their lower edges with the bottom of the said casing A and forming therewith a series of mud pockets or sediment chambers. These wings taper in width from their inner to their outer ends and do not extend quite to the sides of the said casing, thereby concentrating the sediment at the base of the filter in the said pockets. The bottom of the casing A is centrally depressed and the overflow pipe D connects therewith at a point directly beneath the center of the filtering cylinder B so as to draw off the sediment from all the mud pockets. The inlet pipe E communicates with the casing a short distance from the bottom thereof and its delivery end is tangentially arranged to cause the water to whirl or rotate around the said filtering cylinder thereby concentrating the sediment at the base of the filter and washing both filter and casing. In the event of its becoming necessary to draw off the mud or sediment at times when the water in the said casing does not reach a level with the delivery end of the overflow pipe, the latter is provided with a piston P to draw off the same in a positive manner. The said overflow pipe is expended at a point $d$ a short distance above the bottom of the said casing to form a chamber for the reception of a float valve G which serves the purpose of the usual check valve common in lift pumps and is limited in its upward movement by suitable stops so as not to prevent the normal overflow or close the pipe D on the up stroke of piston P and remains open so that any sediment remaining in the overflow pipe D above the valve G will not be deposited above the valve G as the fluid is withdrawn from the casing, and prevent the use of the piston and the normal overflow. The piston or sucker P can have an upward opening check valve, or any other usual arrangement, which will permit the fluid to pass above the same when depressed. The piston P is removed from the overflow pipe when not in actual use. The water enters so as to cause the water in the cistern to turn around a central axis, independent of the form of the cistern but circular is the best. This causes all sediment to gather at or near the axis of rotation. The bottom of the casing being centrally depressed causes the sediment to collect at said central point. The radial arms as described are to form pockets so that the rotary motion will not disturb sediment already deposited and may extend to the sides of the casing and be of any desired height, but they are better as shown. The essential thing in this overflow pipe is that it starts from the bottom of the cistern and may be wholly or in part on the inside, outside or in the wall of the cistern but is better as shown with or without the combination or any part of said combination of depressed bottom, cup filter and radial arms or wings.

A filter as shown would be of limited use. Hence porous pottery, brick, Teneriffe filter rock or any suitable filtering material may be used for the filter.

Having thus described my invention, what I claim, and desire to secure by Letters Patent, is—

1. In a filter having a sediment chamber in its bottom and provided with a filtering media, and having a supply pipe the combination of an overflow pipe communicating with the bottom portion of said filter, a valve located in said overflow pipe, and a piston adapted to work in said overflow pipe for the purpose of removing the sediment from the bottom of said filter, substantially as set forth.

2. In a filter the combination of a casing having a centrally depressed bottom to form a sediment chamber, radial partitions to form a series of pockets in said sediment chamber, a supply pipe for injecting the water into said casing to effect a rotation of said fluid about a central line whereby in the process of precipitating the sediment it is collected in the pockets at the base of the filter and the casing and filter washed, an overflow pipe communicating with the central portion of said depressed bottom, a valve located in said overflow pipe, and a piston constructed to work in said overflow pipe for the purpose of removing the sediment from the series of pockets composing the sediment chamber, substantially as set forth.

3. The herein shown and described filter consisting of, the casing A having its bottom centrally depressed to form a sediment chamber, a series of wings C radially disposed on said depressed bottom to form a series of pockets to receive the sediment, a filtering cylinder centrally disposed within said casing and supported on said wings C, a supply pipe E constructed to discharge the water tangentially into said casing to cause said water to rotate about the filtering cylinder and precipitate the sediment into said pockets, an overflow pipe communicating with the depressed bottom of the casing at a central point to draw off the sediments from said pockets, a floating valve located into said overflow pipe, and a piston adapted to work in said overflow pipe, substantially as and for the purpose set forth.

In testimony whereof I affix my signature in presence of two witnesses.

ABNER D. STRONG.

Witnesses:
A. MAURISE,
GEO. D. PARKER.